United States Patent [19]

Philipp et al.

[11] 3,912,595

[45] Oct. 14, 1975

[54] METHOD OF PURIFYING ENZYMES USING BORONIC ACIDS COVALENTLY BONDED TO AN INSOLUBLE SUPPORT

[75] Inventors: Manfred H. W. Philipp, Freiburg, Germany; Myron L. Bender, Evanston, Ill.; Pablo V. Valenzuela, Santiago, Chile

[73] Assignee: The United States of America as represented by the Secretary of the Department of Health, Education, and Welfare, Washington, D.C.

[22] Filed: Feb. 25, 1974

[21] Appl. No.: 445,665

[52] U.S. Cl............ 195/66 R; 195/63; 195/DIG. 11
[51] Int. Cl.² ......................................... C07G 7/00
[58] Field of Search........ 195/66 R, 63, 68, DIG. 11

[56] References Cited

OTHER PUBLICATIONS

Schott, Angewandte Chem. Int. Ed. Vol. 11 No. 9 pp. 824–825 (1972).

*Primary Examiner*—Lionel M. Shapiro

[57] ABSTRACT

Soluble serine-hydrolytic enzymes are purified by passing a solution at pH 7.5 through a column packed with a granular support to which is covalently bonded a boronic acid to reversibly complex the enzyme; washing the column with a first buffer solution; freeing the enzyme by washing the column with a second buffer solution; and isolating the freed enzyme.

8 Claims, No Drawings

METHOD OF PURIFYING ENZYMES USING BORONIC ACIDS COVALENTLY BONDED TO AN INSOLUBLE SUPPORT

This invention relates to a method for purifying soluble serine-hydrolytic enzymes by reversibly complexing the enzymes with boronic acids covalently bonded to a water-insoluble support medium, washing impurities from the support medium, and freeing the reversibly complexed enzymes, as well as to water-insoluble support media to which are covalently bonded boronic acid complexing groups.

This method provides a high degree of specificity in separating enzymes with a serine group at the active catalytic site from mixtures, for example, $\alpha$-chymotrypsin from trypsin or chymotrypsinogen.

Among the techniques commonly used to separate and purify enzymes from mixtures is gel filtration, as for example on a column packed with Sephadex[R], a dextran product of Pharmacia Fine Chemicals AB. Analytical and preparative isolation of enzymes by the gel filtration technique depends upon differences in molecular size rather than on structural differences among molecules of approximately the same molecular weights. See, generally, "Sephadex, Gel Filtration Theory and Practice," Pharmacia Fine Chemicals, Appelbergs Boktryckeri AB, June, 1970. Thus, it is clear that a significant limitation of the gel filtration method is the inability to separate enzymes except on the basis of size or molecular weight.

Another technique for the separation of enzymes, such as proteases and glucosidases, from various impurities is precipitation of complexes with heteropoly acids, e.g., phosphotungstic acid, phosphomolybdic acid, as taught in U.S. Pat. Nos. 3,483,085 and 3,655,513 to Sternberg. Although good results are obtained by this method, it will be apparent that a deficiency is the cumbersome manipulative steps required in isolating the heteropoly acid-enzyme complex and liberating the purified enzyme therefrom.

Although particular enzymes, such as microbial rennets, are obtained in a high degree of purity by passage over an adsorbing silicate as disclosed by Moelker et al. in U.S. Pat. No. 3,591,388, the general rule pointed out at col. 2, lines after 32, of the Moelker reference is that non-specific adsorption of proteins occurs on substrates such as silicates.

Recent advances in the field of enzyme chemistry include the stabilization of enzymes by permanent covalent bonding of an enzyme to an insolubilizing substrate as taught, for example, by:

| | |
|---|---|
| 3,278,392 | Patchornik |
| 3,556,945 | Messing |
| 3,574,062 | Sato |
| 3,639,213 | Ginger et al. |
| 3,645,852 | Axen et al. |
| 3,666,627 | Messing |
| 3,669,841 | Miller |
| 3,713,982 | Emery |
| 3,767,531 | Olson et al. |

However, the permanent covalent bonding characteristic of the products of these references renders the products unsuitable for purification of enzymes without scission of the covalent enzyme-substrate bond and possible inactivation of the enzyme.

Kagawa et al., in U.S. Pat. No. 3,594,282, teach that l-asparaginase can be separated from cellular extracts without destruction of enzymatic activity by adsorption on an ion-exhanger. However, this method is ineffective for the separation of serine-hydrolytic enzymes, particularly chymotrypsin, subtilisin and cholinesterase, from cell extracts or other enzymatic materials.

Thus, there is a continuing need for methods of purifying serine-hydrolytic enzymes which provides for specific separation of enzymes of only slightly differing molecular structural characteristics, have a minimum of manipulative steps, and permit recovery of active enzyme isolates.

It has been found, in accordance with this invention, that serine–hydrolytic enzymes can be separated specifically with high selectivity and with a minimum of manipulative steps to yield products of high enzyme activity by reversibly complexing the enzyme being purified at pH near 7.5 with a boronic acid derivative covalently bonded to a water-insoluble granular support and freeing the enzyme at the same or a different pH. It has further been found in accordance with this invention that a boronic acid derivative covalently bonded to a granular water-insoluble support material provides a suitable material for the separation of soluble serine-hydrolytic enzymes from other types of protein materials, including structurally similar proteins.

"Soluble serine-hydrolytic enzyme," in the specification and claims, means a soluble globular protein in which a serine group is located at the active catalytic site. The structure of globular hydrolytic proteins is set forth in Ch. 1 of "The Enzymes," P. D. Boyer, ed., Vol 1, Academic Press, New York (3rd ed. 1970) at 86–89. Among the soluble serine-hydrolytic enzymes specifically separated by the method of this invention are proteolytic enzymes both of mammalian origin, such as chymotrypsin, and of bacterial origin, such as subtilisin. Also separated by the process of this invention are serine-esterases, such as cholinesterase. The serine-hydrolytic enzymes are separated in accordance with this invention from closely-related protein materials, including the inactive enzyme precursors commonly known as zymogens and metalloenzymes, as well as from nonproteinaceous impurities.

Reversible complexes of the serine-hydrolytic enzyme being purified and the boronic acid covalently bonded to a water-insoluble support are formed by passing a solution containing the enzyme at a pH from 7.0 to 8.5 over a column packed with the support to which is covalently bonded boronic acid. To assure removal of impurities from the serine-hydrolytic enzyme, the column containing the complexed enzyme is washed with a first buffer solution at pH 7.0 to 8.5 before the enzyme is liberated from the complex with the boronic acid using a second buffer solution at the same or different pH and isolated from an eluate of the second buffer solution. Preferably, the enzyme will be liberated from the complex at a different pH.

Buffer solutions suitable for maintaining pH between 7.0 and 8.5 during the complex formation and those which can be used to liberate the purified serine-hydrolytic enzyme from the complex with boronic acid include those listed in "The Merck Index," Merck and Co., Inc., Rahway, N.J. (8th ed., 1968) at 1308 and in "Handbook of Chemistry and Physics," The Chemical Rubber Co., Cleveland, Ohio (51st ed., 1970) at D-103, as well as other commonly used buffer solutions, except for tris(hydroxymethyl)aminomethane buffer and borate buffers. Preferred buffers for the aqueous solutions from which the serine-hydrolytic enzymes are complexed with the boronic acid covalently bonded to the support include phosphate buffers and the volatile buffers described below. Although any pH from about 7.0 to 8.5 is operable for the complex formation step, the preferred pH range is from about 7.2 to about 7.8, especially about 7.5.

The second buffer solution used to liberate the soluble serine-hydrolytic enzyme from the complex with boronic acid can have any pH which will not cause appreciable denaturation of the enzyme. Thus, for the purification of subtilisin, the preferable range is between about 4.0 and about 10.00. For chymotrypsin, the preferred range is from pH 3.0 to 11.0. It will be understood that although buffer solutions are preferred for use in the method of this invention, non-buffering solutions of appropriately adjusted pH can also be used.

Liberation of the serine-hydrolytic enzyme from the complex with boronic acid can be done using a buffer in the same range as that in which the complex is formed. However, more rapid separation of the enzyme from the complex is achieved when a different pH is selected for this purpose so that a different pH will generally be selected and is generally preferred. Preferred buffers for this operation include phosphate and carbonate buffers as well as volatile buffers such as triethylammonium bicarbonate (pH 7.5–8.5), triethylammonium acetate (pH 4–5) and triethylammonium formate (pH 3). The volatile or fugitive buffers are particularly preferred because they are readily removed by freeze drying to afford a pure enzyme product, because the ammonium salt buffers provide an antimicrobial action to the enzyme solutions and these fugitive buffers do not contaminate the product.

Although any technique can be used to isolate the purified enzyme from the buffer solution containing it, freeze drying is generally preferred.

"Granular water-insoluble support," as used in the specification and claims, means any solid particulate material which can be covalently bonded to a boronic acid derivative and packed in a column for preparative or analytical separation purposes. The support material may be fibrous or microcrystalline.

Among granular insoluble supports usable in the practice of this invention are the higher carbohydrate derivatives, siliceous materials, and synthetic organic polymers. Typical of the higher carbohydrate derivatives usable as insoluble support materials are starch, cellulose, cellulose ethers, dextran, agarose, and the like. The use of preferred carbohydrate support materials to immobilize enzymes is set forth in Patchornik, U.S. Pat. No. 3,278,392; Ginger et al., U.S. Pat. No. 3,639,213; and Emery, U.S. Pat. No. 3,713,982; and Axen et al., U.S. Pat. No. 3,645,852, among others.

Of these materials, cellulose and sepharose are especially preferred for the practice of this invention. When sepharose is the substrate of choice, no further treatment is required. Carbohydrate substrates used in this invention are preferably pretreated with sodium hydroxide or another suitable alkaline material, although the pretreatment is not mandatory.

Among the siliceous materials usable as insoluble supports are those which have reactive silanol groups as taught in Messing, U.S. Pat. Nos. 3,556,945 and 3,666,627; and Miller, U.S. Pat. No. 3,669,841, supra, including fused silica materials.

Typical of the synthetic polymers useful in the practice of this invention are polyurethanes, as taught by Sato in U.S. Pat. No. 3,574,062; phenol-formaldehyde resins, as disclosed by Olson et al. in U.S. Pat. No. 3,767,531; and vinylidene polymers, of which polystyrene, polyethylene, polyvinyl chloride, and polymethyl methacrylate are exemplary.

"Boronic acid group," as used in the specification and claims, means the $-B(OH)_2$ function attached to an alkyl or aryl hydrocarbon residue having at least one additional functional group capable of forming a covalent bond with a selected granular water-insoluble support material. Among compounds having a boronic acid group and the requisite site for covalent bonding are the aminophenylboronic acids, the carboxyphenylboronic acids, vinylphenylboronic acids, N-methacrylamidophenylboronic acids and aminonitrophenylboronic acids. Aryl compounds are preferred owing to generally greater availability.

One preferred method of bonding boronic-acid bearing-groups to a cellulose or higher carbohydrate derivative is by a series of reactions in which the higher carbohydrate, represented by "Cell," is treated first with a cyanogen halide, then with an oligopeptide, and finally with molar excess of a mixture of a water-soluble carbodiimide and an aminophenylboronic acid:

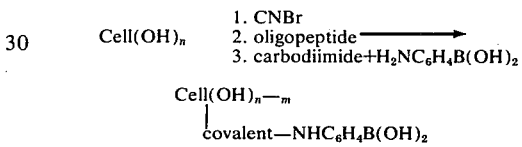

Either cyanogen bromide or cyanogen iodide can be used in the first step of the above reaction sequence. However, cyanogen bromide is preferred owing to its generally higher availability. Activation of the higher carbohydrate with the cyanogen halide should be done in a weakly alkaline aqueous medium, such as taught by Axen et al. in U.S. Pat. No. 3,645,852. Generally the temperature at which the first step of the reaction sequence is done should be chosen in the range from about 0° to about 50°C. Preferably the reaction with cyanogen halide is done at pH 10–12 and at temperatures below room temperature, that is, from about 0° to about 15°C.

The reaction between the product of a carbohydrate and the cyanogen halide and an oligopeptide is done under the same conditions as for the reaction with cyanogen halide, that is, in a weakly alkaline aqueous solution at a temperature from about 0° to about 50°C. Preferred conditions are pH in the 10-12 range and a temperature from about 15° to about 35°C.

For purposes of the foregoing reaction, oligopeptide means any lower oligomer of an aminoacid or mixtures thereof, preferably an oligomer containing from 2 to 8 monomeric aminoacid units. Among the preferred aminoacids is glycine, most preferably the trimer thereof.

The third step of the reaction sequence involves treating the carbohydrate-cyanogen halide-oligopeptide product with a molar excess of a mixture of a water-soluble carbodiimide and an aminophenylboronic acid. Preferably, the carbodiimide-boronic acid mixture is used in about tenfold excess with respect to the activated groups on the carbohydrate support and the carbodiimide and boronic acid are present in equimolar amounts.

Of the water-soluble carbodiimides which are known and are suitable for use according to this invention, the preferred carbodiimides are N-cyclohexyl-N'-β-(4-methylmorpholinium)ethylcarbodiimide and 1-ethyl-3-(3-dimethylaminopropyl)carbodiimide. Although any of the aminophenylboronic acids is operable for the practice of this invention, the meta- and para-isomers are preferred.

Another preferred covalent bonding system between a carbohydrate substrate and a boronic acid-bearing compound is prepared by reaction between a cyanogen halide-activated carbohydrate, such as cellulose, and a diamine. The product is then treated with a cyclic anhydride and finally with a carbodiimide-aminoboronic acid mixture as above.

Among the diamines useful in building the covalent bridge are the alkylene diamines, such as ethylene diamine, trimethylene diamine, hexamethylene diamine, and the like, as well as diethylene triamine, dipropylene triamine, dibutylene triamine, and the like. The corresponding ether diamines of the type $N_2H(CH_2)_nO(CH_2)_nNH_2$, wherein $n$ is an integer between 2 and 6 are also useful.

Cyclic anhydrides useful in the foregoing procedure include succinic anhydride, glutaric anhydride, phthalic anhydride, maleic anhydride, mesaconic anhydride and the like. The reaction between the anhydride and the product of the reaction between amine and cyanogen halide-activated carbohydrate is carried out in the presence of a two fold excess of a tertiary amine. Although pyridine is preferred for this purpose, triethylamine, tripropylamine, and the like are also usable.

Another useful route to covalently bonded boronic acid on a cellulose substrate, wherein "Cell-" denotes cellulose or another higher carbohydrate and X is Br or Cl, is:

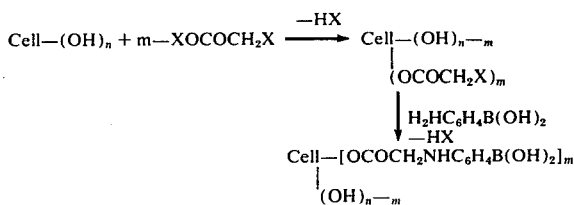

Another method by which a boronic acid-bearing group is covalently bonded to a cellulose or higher carbohydrate derivative is by the use of cyanuric chloride as a covalent bridging group.

When a synthetic organic polymer is chosen as the granular water-insoluble support material, the boronic acid group can be introduced either by copolymerization with other vinylic monomers or by graft polymerization on a substrate polymer. Thus, a boronic acid compound having a polymerizable group, e.g., vinylphenylboronic acid, can be copolymerized with styrene and the like. Alternatively, vinylphenylboronic acid is graft copolymerized on a preformed polymer, such as polyethylene.

The types of reactions applicable to vinylphenylboronic acid are useful with N-methacrylamidophenylboronic acid obtained from aminophenylboronic acid and methacrylyl chloride in accordance with Schott, Angew. Chem. internat. Edit., Vol. 11, No. 9 (1972) at 824.

A column, for the purposes of this invention, is a tube of which the length is greater than the diameter. The tube has a valve on each end to control the flow of water or other liquid therethrough.

The granular material with which the column is packed should be of particle size such that enough active sites are present to permit efficient separation and the column is free-flowing. Granular material having a range of 25–200 mesh is acceptable for the purposes of this invention. However, the preferred particle size is about 35–100 mesh.

Boronic acid derivatives used to prepare the covalently bonded support materials of this invention are conveniently made by reaction between a Grignard reagent or other organometallic compound and a borate ester according to the equation:

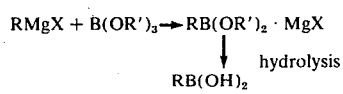

as set forth in Kirk-Othmer, "Encyclopedia of Chemical Technology," II, Vol. 3, Interscience Publishers, New York (1964), after 717. Other boronic acid derivatives such as m-aminobenzeneboronic acid, are available commercially.

Arsonic acid derivatives having a second functional group which is capable of bonding with a support material as described above for boronic acid derivatives can also be prepared. These covalently-bonded arsonic acid derivatives also form reversible complexes with serine-hydrolytic proteins. However, complexes formed between arsonic acid and the enzymes are somewhat stronger than those formed with boronic acids, so that the pH must be adjusted in order to release the enzyme from the complex with arsonic acid.

Complexes between arsonic acids and serine-hydrolytic enzymes are formed from pH 5.0 to 7.0, but preferably about pH 6.0. Because of the tendency of serine-hydrolytic enzymes to denature at pH substantially below 5.0, the enzymes are liberated from the complex with arsonic acid at pH above 7.0, preferably from about 7.0 to about 10.0 to avoid alkaline denaturation.

Although mechanisms and structures have been proposed to account for a somewhat related bonding of hydrolytic enzymes with free boronic acids as manifested by a decrease in enzyme activity, no structure or mechanism is proposed here to account for the separations achieved with the materials and methods of this invention. References to the inhibition of enzymes by complexation with boronic acids or arsonic include M. Philipp, dissertation submitted to Graduate School of Northwestern University, Evanston, Illinois, June, 1971, in partial fulfillment of requirements for the Ph.D. degree and references therein as well as M. Philipp et al., Proc. Nat'l Academy of Sciences (U.S.)., Vol. 68, No. 2 (1971) at 478.

EXAMPLE 1

Binding of a boronic acid group to dextran

A. Activation of dextran with cyanogen bromide

Two hundred milligrams of dextran is combined with 8 milliliters of an aqueous solution containing 25 milligrams of cyanogen bromide per milliliter of water. The reaction takes place at 0°C. while the mixture is stirred for about 30 minutes. During this time, the pH of the solution is kept between 10 and 11.5 by the addition of 2N sodium hydroxide solution as needed. The product is washed with suction on a fritted glass filter using cold water and used directly for the ensuing steps.

B. Attachment of the boronic acid group to activated dextran

The product obtained above is contacted with 200 milligrams of triglycine in 2 milliliters of 0.1 M sodium bicarbonate solution and stirred for about 30 hours at room temperature. The product is filtered on a fritted glass filter and washed successively with 0.1 M sodium bicarbonate, 0.003 M hydrochloric acid, water and 0.5 M sodium chloride solution and then treated with a tenfold molar excess of a 1:1 molar mixture of m-aminophenylboronic acid (Aldrich Chemical Co.) and N-cyclohexyl-N'-$\beta$-(4-methylmorpholinium)ethylcarbodiimide at pH 4.5–6.0 for 6 hours at 0° C. with stirring. The product is washed with water and used to pack a column.

EXAMPLE 2

In like manner, m-aminophenylboronic acid is covalently bonded to cellulose previously mercerized by treatment with 17.5% sodium hydroxide for 17 hours at 0°C. using 1-ethyl-3-(3-dimethylaminopropyl)carbodiimide as the water soluble carbodiimide.

EXAMPLE 3

Agarose (Sepharose 2B, a water-swollen product having ball-shaped particles) is activated with cyanogen iodide as set forth in Example 1, treated with glycyl-alanyl-glycine, and reacted with a 1:1 molar mixture of a water soluble carbodiimide and m-aminophenylboronic acid as in Example 1. The product is prepared for use by being packed in a column and being washed with a phosphate buffer at pH 7.5.

EXAMPLE 4

Subtilisin (Novo or BPN' subtilisin) obtained according to A. N. Glazer, J. Biol. Chem., vol. 243 (1968) at 433 is suspended in triethylammonium bicarbonate buffer solution at pH 7.5 at an enzyme level of 0.01 M. The solution is passed through a column packed with the material prepared according to Example 1 and previously equilibrated with triethylammonium bicarbonate buffer at pH 7.5. The column now containing complexed enzyme is washed with the same buffer at pH 7.5. The enzyme is freed by washing the column containing complexed enzyme with acetate buffer at pH 5–6 and the product enzyme is recovered from the buffer solution by freeze drying.

EXAMPLE 5

Cellulose to which is covalently bonded a boronic acid as described in Example 2 is packed in a column and washed with phosphate buffer at pH 8.0. A solution of $\alpha$-chymotrypsin (Worthington Biochemicals of Freehold, New Jersey) in triethylammonium bicarbonate (1.0 M) at pH 7.8 is passed through the column, which is washed with bicarbonate buffer at pH 7.8. The enzyme is freed from the complex with boronic acid groups by washing with a bicarbonate buffer at pH 7.8 and isolated from the solution in the usual manner.

EXAMPLE 6

Cholinesterase is purified by treatment is a column packed with material prepared according to Example 3. The comples formation is carried out at pH 7.5 as is the washing. The enzyme is liberated at pH 6.5 or 9.0 by use of an appropriate buffer solution.

EXAMPLE 7

Agarose (Sepharose 2B) activated by cyanogen bromide and treated stepwise with hexamethylene diamine, glutaric anhydride and with the carbodiimide-m-aminophenylboronic acid mixture of Example 1 is packed in a column and washed with phosphate buffer at pH 7.5. The column is used to purify subtilisin.

EXAMPLE 8

Column material prepared according to Example 2 is washed with phosphate buffer at pH 7.0 and used to purify chymotrypsin containing chymotrypsinogen. The mixture at pH 7.0 (phosphate buffer) is passed through the column which is washed with a phosphate buffer at pH 7.0. The zymogen material is thus removed from the enzyme, which is liberated from a complex with boronic acids groups by washing the column with phosphate buffer at pH 9.0.

What is claimed is:

1. A method for the purification of a soluble serine-hydrolytic enzyme consisting of passing an aqueous solution of the soluble serine-hydrolytic enzyme at pH from 7.0 to 8.5 through a column packed with a granular water-insoluble support to which is covalently bonded a boronic acid group attached by an alkyl or aryl hydrocarbon residue having at least one additional functional group capable of forming a covalent bond with the granular water-insoluble support to reversibly complex said enzyme.

2. The method of claim 1, wherein said enzyme is chymotrypsin.

3. The method of claim 1, wherein said enzyme is subtilisin.

4. The method of claim 1, wherein said enzyme is cholinesterase.

5. The method of claim 1, wherein said boronic acid group is m-aminophenylboronic acid.

6. The method of claim 1, wherein said granular water-insoluble support is a higher carbohydrate.

7. The method of claim 1, wherein said second buffer solution is at a pH different from the pH of the first buffer solution.

8. The method of claim 1, wherein said boronic acid group is covalently bonded to a higher carbohydrate water-insoluble support material by treating the higher carbohydrate material in sequence with cyanogen bromide, an oligopeptide, and a water-soluble carbodiimide and an aminophenylboronic acid.

* * * * *